US009102388B2

(12) United States Patent
Lee et al.

(10) Patent No.: US 9,102,388 B2
(45) Date of Patent: Aug. 11, 2015

(54) EMERGENCY POSITION INDICATING RADIO BEACON TERMINAL AND APPARATUS AND METHOD FOR MONITORING OPERATING STATE THEREOF

(75) Inventors: Jeom-Hun Lee, Daejeon (KR); Sanguk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 110 days.

(21) Appl. No.: 13/575,998

(22) PCT Filed: Mar. 11, 2011

(86) PCT No.: PCT/KR2011/001702
§ 371 (c)(1),
(2), (4) Date: Jul. 30, 2012

(87) PCT Pub. No.: WO2011/112030
PCT Pub. Date: Sep. 15, 2011

(65) Prior Publication Data
US 2012/0299776 A1     Nov. 29, 2012

(30) Foreign Application Priority Data

Mar. 12, 2010    (KR) .................... 10-2010-0022407
Mar. 10, 2011    (KR) .................... 10-2011-0021310

(51) Int. Cl.
     *G08B 1/08*        (2006.01)
     *H04M 11/04*     (2006.01)
(Continued)

(52) U.S. Cl.
CPC . *B63C 9/00* (2013.01); *G01S 19/17* (2013.01); *G08B 21/028* (2013.01); *H04M 11/04* (2013.01)

(58) Field of Classification Search
CPC ...... B63C 9/0005; G01S 19/17; G08B 21/023
USPC ............ 340/539.22, 539.11; 455/13.4, 404.2
See application file for complete search history.

(56) References Cited

U.S. PATENT DOCUMENTS 4,033,002 A *   7/1977   Higgs .......................... 441/26
4,903,243 A      2/1990   Turner, Jr.
(Continued)

FOREIGN PATENT DOCUMENTS

JP     10-075188 A     3/1998
JP     2000-103391 A     4/2000
(Continued)

OTHER PUBLICATIONS

International Maritime Organization; Resolution A.810(19) adopted on Nov. 23, 1995 (Agenda item 10); "Performance Standards for Float-Free Statellite Emergency Position-Indicating Radio Beacons (EPIRBs) Operating on 406 MHz", pp. 209-212; www.imo.org/blast/DAta.asp?doc_id=9829...A%20810(19).
(Continued)

*Primary Examiner* — Fekadeselassie Girma
(74) *Attorney, Agent, or Firm* — Ladas & Parry LLP

(57) ABSTRACT

The present invention relates to an emergency position indicating radio beacon (EPIRB) terminal for confirming positions of ships and rescuing the ships during a marine disaster in a marine search and rescue system and an apparatus and a method for monitoring an operating state of the EPIRB terminal. The EPIRB terminal comprises: a sensor unit for sensing the sinking of a ship in which the EPIRB terminal is provided; a generation unit for generating a distress message corresponding to the sensed result of the sensor unit; and a transmission unit for broadcasting a distress signal including the distress message. The sensor unit comprises: a water-pressure sensor for outputting a water-pressure detection signal by sensing the water pressure in the inside of the ship; a moisture sensor for outputting a moisture detection signal by sensing the moisture inside the ship; and a separation sensor for outputting a separation detection signal by sensing the separation of the EPIRB terminal from the ship. The sensor unit outputs a generating request signal of the distress message to the generation unit by normally sensing the sinking of the ship when the water-pressure detection signal, the moisture detection signal, and the separation detection signal are outputted.

15 Claims, 4 Drawing Sheets

(51) Int. Cl.
    *G08B 23/00*     (2006.01)
    *H04B 7/00*     (2006.01)
    *B63C 9/00*     (2006.01)
    *G01S 19/17*     (2010.01)
    *G08B 21/02*     (2006.01)

(56) References Cited

U.S. PATENT DOCUMENTS

| | | | | |
|---|---|---|---|---|
| 4,932,910 A | * | 6/1990 | Hayday | 441/11 |
| 4,981,453 A | * | 1/1991 | Krishan et al. | 441/6 |
| 5,066,256 A | * | 11/1991 | Ward, Sr. | 441/7 |
| D331,548 S | * | 12/1992 | Cardamone et al. | D10/107 |
| 5,197,911 A | * | 3/1993 | Wilson | 441/10 |
| 5,319,376 A | * | 6/1994 | Eninger | 342/357.4 |
| 5,348,502 A | * | 9/1994 | Wigram | 441/7 |
| 5,365,873 A | * | 11/1994 | Wigram | 114/367 |
| H001560 H | * | 7/1996 | Gill et al. | 342/385 |
| 5,793,280 A | * | 8/1998 | Hincher | 340/326 |
| 6,123,593 A | * | 9/2000 | Mercer | 441/26 |
| 6,261,142 B1 | * | 7/2001 | Fiotakis | 441/11 |
| 6,383,045 B1 | * | 5/2002 | Eckardt | 441/6 |
| 6,388,617 B1 | * | 5/2002 | Flood et al. | 342/386 |
| 7,056,179 B2 | * | 6/2006 | Courtney | 441/90 |
| 7,148,811 B1 | * | 12/2006 | Bustamante et al. | 340/850 |
| 7,261,606 B2 | * | 8/2007 | Mickelson et al. | 441/6 |
| 7,492,251 B1 | * | 2/2009 | Katz | 340/539.22 |
| 7,586,463 B1 | * | 9/2009 | Katz | 343/895 |
| 7,855,654 B2 | * | 12/2010 | Katz | 340/573.6 |
| 8,509,998 B2 | * | 8/2013 | Thomas et al. | 701/49 |
| 8,512,088 B2 | * | 8/2013 | Jone et al. | 441/21 |
| 2008/0174484 A1 | * | 7/2008 | Katz | 342/357.07 |
| 2009/0209227 A1 | * | 8/2009 | Greer et al. | 455/404.2 |
| 2009/0271054 A1 | * | 10/2009 | Dokken | 701/21 |
| 2009/0280705 A1 | * | 11/2009 | Puls et al. | 441/88 |
| 2011/0095914 A1 | * | 4/2011 | Velado et al. | 340/984 |
| 2012/0232746 A1 | * | 9/2012 | Wiederwohl | 701/33.4 |

FOREIGN PATENT DOCUMENTS

| | | |
|---|---|---|
| JP | 2002-314439 A | 10/2002 |
| JP | 2005-186682 A | 7/2005 |
| KR | 20-0242412 Y1 | 7/2001 |
| KR | 1020050013463 A | 2/2005 |
| KR | 1020100041516 A | 4/2010 |

OTHER PUBLICATIONS

International Maritime Organization IMO; A 19/Res.814 Dec. 15, 1995; Assembly 19*th* session Agenda item 10; Resolution A.814(19) adopted on Nov. 23, 1995; "Guidelines for the Avoidance of False Distress Alerts" 8 pages; www.imo.org/blast/blastData.asp?doc_id=10472...814(19).pdf.

International Maritime Organization IMO; "Measures to Reduce the Number of False Distress Alerts", MSC/Circ.861; May 22, 1998; 2 pages.

International Search Report; mailed Oct. 10, 2011; PCT/KR2011/001702.

\* cited by examiner

US 9,102,388 B2

EMERGENCY POSITION INDICATING RADIO BEACON TERMINAL AND APPARATUS AND METHOD FOR MONITORING OPERATING STATE THEREOF

TECHNICAL FIELD

Exemplary embodiments of the present invention relate to a maritime search and rescue system; and, more particularly, to an Emergency Position Indicating Radio Beacon (EPIRB) terminal for position identification and rescue of a vessel in the event of maritime disaster in a maritime search and rescue system, and an apparatus and method for observing a state of an operation thereof.

BACKGROUND ART

In general, in a maritime search and rescue system, an EPIRB device used for position identification and rescue of a vessel in the event of maritime disaster includes an EPIRB terminal and a housing for installing the EPIRB terminal in a vessel, for example, a container. The EPIRB terminal is installed in the vessel through the housing. Before the vessel sinks under the sea and reaches a predetermined depth of water, for example, 4 m under the sea, the housing is automatically separated from the vessel or container and rises to the surface of the water. The EPIRB terminal transmits a distress signal to a satellite, for example, a COSPAS-SARSAT satellite, at a predetermined period.

The COSPAS-SARSAT satellite receives the distress signal from the EPIRB terminal, and transmits the received distress signal to a local terminal located in a region nearest to the EPIRB terminal, for example, a Local User Terminal (LUT). The LUT calculates and estimate the distress position of the vessel equipped with the EPIRB terminal, and transmits the distress signal to a Mission Control Center (MCC) of a corresponding area. The MCC identifies the position of the distressed vessel through the distress signal, and rescues the distressed vessel.

As described above, in the EPIRB device, the EPIRB terminal is installed in the vessel by the housing, and the EPIRB terminal is separated from the vessel by the sensing operation of sensors included in the EPIRB terminal, for example, a water pressure sensor and a water sensor, rises to the surface of the water, and automatically broadcasts the distress signal. At this time, the water pressure sensor and the water sensor perform the sensing operation when the EPIRB terminal enters the water. However, in a case in which water penetrates into the EPIRB terminal due to various environmental factors in the vessel equipped with the EPIRB terminal and on the sea, the water pressure sensor and the water sensor may malfunction.

Even when the water pressure sensor and the water sensor included in the EPIRB terminal malfunction, the EPIRB terminal broadcasts the distress signal, and the COSPAS-SARSAT satellite receives the distress signal from the EPIRB terminal, and transmits the received distress signal to the LUT located in a region nearest to the EPIRB terminal, the LUT calculates and estimate the distress position of the vessel equipped with the EPIRB terminal, and transmits the distress signal to the MCC of the corresponding area, and the MCC identifies the position of the distressed vessel through the distress signal, and rescues the distressed vessel.

In other words, the maritime search and rescue system normally performs the maritime search and rescue operation, without regard to the malfunction of the water pressure sensor and the water sensor included in the EPIRB terminal. In particular, a lot of resources are wasted by the wrong transmission of the distress signal caused by the malfunction of the EPIRB terminal. For example, according to the announcement of the COSPAS-SARSAT Secretariat in 2009, it was confirmed that about 96% of the distress signals broadcast from the EPIRB terminals was wrongly transmitted, and thus, a lot of resources was being wasted globally.

Therefore, there is a need for minimizing the malfunction of the EPIRB terminal in the maritime search and rescue system and the wrong transmission of the distress signal caused by the malfunction of the EPIRB terminal.

DISCLOSURE

Technical Problem

An embodiment of the present invention is directed to an EPIRB terminal in a maritime search and rescue system, and an apparatus and method for observing a state of an operation thereof.

Another embodiment of the present invention is directed to an EPIRB terminal, which minimizes the malfunction of the EPIRB terminal and the wrong transmission of the distress signal in the maritime search and rescue system, and an apparatus and method for observing a state of an operation thereof.

Technical Solution

In accordance with an embodiment of the present invention, an emergency position indicating radio beacon (EPIRB) terminal in a maritime search and rescue system includes: a sensor unit configured to sense a sinking of a vessel equipped with the EPIRB terminal; a generating unit configured to generate a distress message corresponding to the sensing result of the sensor unit; and a transmitting unit configured to broadcast a distress signal including the distress message, wherein the sensor unit includes: a water pressure sensor configured to sense water pressure inside the vessel and output a water pressure sensing signal; a water sensor configured to sense water inside the vessel and output a water sensing signal; and a separation sensor configured to sense a separation of the EPIRB terminal from the vessel and output a separation sensing signal, in a case in which all of the water pressure sensing signal, the water sensing signal, and the separation sensing signal are outputted, the sensor unit recognizes the case as the sinking of the vessel, and outputs a distress signal generation request signal to the generating unit.

In accordance with another embodiment of the present invention, an apparatus for monitoring an emergency position indicating radio beacon (EPIRB) terminal in a maritime search and rescue system includes: a housing configured to install the EPIRB terminal inside a vessel; and the EPIRB terminal disposed inside the housing and configured to sense a sinking of the vessel, wherein the housing includes: a transparent window configured to monitor an operation state of the EPIRB terminal in real time; and a hole configured to drain water flowing into the housing to prevent the malfunction of the EPIRB terminal, in a case in which the EPIRB terminal senses the sinking of the vessel, the housing automatically separates the EPIRB terminal from the vessel, and the EPIRB terminal broadcasts a distress signal to a COSPAS-SARSAT satellite at a predetermined period.

In accordance with another embodiment of the present invention, a method for monitoring an emergency position indicating radio beacon (EPIRB) terminal in a maritime search and rescue system includes: sensing water pressure, water, and separation within a housing provided within a vessel equipped with the EPIRB terminal; providing an operation state of the EPIRB terminal in real time according to the sensing results of the water pressure, the water, and the separation; and separating the EPIRB terminal from the vessel when the sinking of the vessel is sensed from the sensing results of the water pressure, the water, and the separation, and broadcasting a distress signal to a COSPAS-SARSAT satellite at a predetermined period, wherein the EPIRB terminal is installed in and separated from the vessel by the housing, and the housing drains water flowing into the housing through a hole to prevent the malfunction of the EPIRB terminal, and provides an operation state of the EPIRB terminal through a transparent window to the outside of the housing in real time.

Advantageous Effects

In accordance with the exemplary embodiments of the present invention, the operation state of the EPIRB terminal in the maritime search and rescue system is easily monitored in real time, thereby minimizing the malfunction of the EPIRB terminal and the wrong transmission of the distress signal caused by the malfunction of the EPIRB terminal. Therefore, the resource waste of the maritime search and rescue system can be minimized, and the use efficiency of the maritime search and rescue system can be maximized.

BEST MODE

Figure 1:
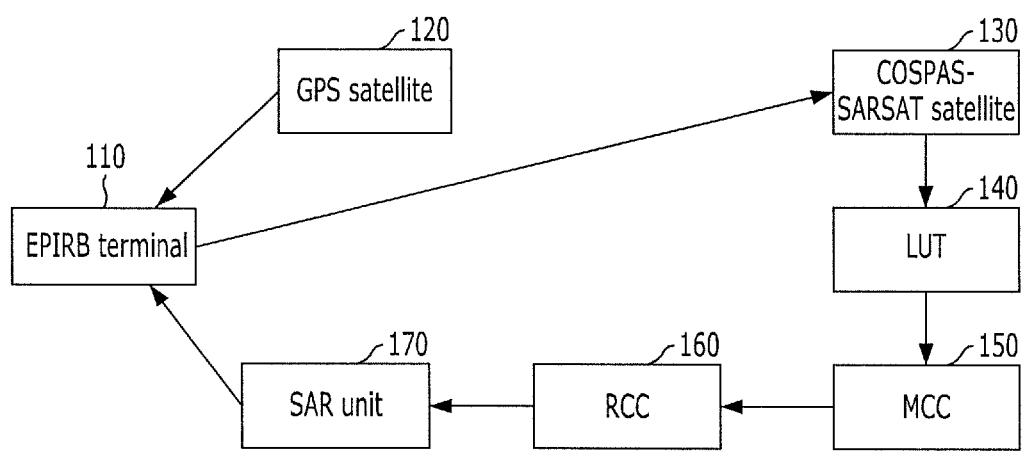
FIG. 1 is a configuration diagram schematically illustrating a maritime search and rescue system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

The present invention provides an EPIRB terminal in a maritime search and rescue system, and an apparatus and method for observing an operation state thereof. Embodiments of the present invention provide an EPIB terminal, which is installed in a vessel or container in order for position identification and rescue of vessels in the event of maritime disaster and minimizes the malfunction and the wrong transmission of distress signal (or alarm signal) thereof, and an apparatus and method for observing an operation state thereof.

In addition, embodiments of the present invention provide an EPIRB terminal, which prevents the malfunction in the maritime search and rescue system, for example, the malfunction of sensors included therein, and monitors the operation state of the EPIRB terminal in real time to thereby minimize the malfunction of the EPIRB terminal and the wrong transmission of a distress signal caused by the malfunction of the EPIRB terminal, and an apparatus and method for observing an operation state thereof. The present invention prevent the malfunction of the EPIRB terminal installed in the vessel by the housing, in particular, sensors included in the EPIRB terminal, for example, a separation sensor, a water pressure sensor, and a water sensor, and minimizes the malfunction of the sensors by monitoring the operation states of the sensors in real time, and the EPIRB terminal's wrong transmission of the distress signal caused by the malfunction of the sensors. A maritime search and rescue system in accordance with an embodiment of the present invention will be described below in more detail with reference to FIG. 1.

FIG. 1 is a configuration diagram schematically illustrating a maritime search and rescue system in accordance with an embodiment of the present invention.

Referring to FIG. 1, the maritime search and rescue system includes an EPIRB terminal 110, a Global Positioning System (GPS) satellite 120, a COSPAS-SARSAT satellite 130, a Local User Terminal (LUT) 140, a Mission Control Center (MCC) 150, a Rescue Coordination Center (RCC) 160, and a Search and Rescue (SAR) unit 170. The EPIRB terminal 110 is installed in vessels and identifies the positions of vessels in order to rescue the vessels at the event of maritime disaster. The GPS satellite 120 provides the position information of the EPIRB terminal 110 to the EPIRB terminal 110. The COSPAS-SARSAT satellite 130 receives a distress signal from the EPIRB terminal 110. The LUT 140 receives the distress signal broadcast by the EPIRB terminal 110 from the COSPAS-SARSAT satellite 130, and calculates and estimates the position of the distressed vessel equipped with the EPIRB terminal 110. The MCC identifies the position of the distressed vessel through the distress signal transmitted from the LUT 140, and allows the SAR unit 170 to perform the distressed vessel rescue through the RCC 160.

The EPIRB terminal 110 is installed in a vessel, for example, a container, through the housing. Before the vessel sinks under the sea and reaches a predetermined depth of water, for example, 4 m under the sea, the housing is automatically separated from the vessel or container and rises to the surface of the water. At this time, the EPIRB terminal 110 transmits the distress signal (or alarm signal) to the COSPAS-SARSAT satellite 130 at a predetermined period. The EPIRB terminal 110 broadcasts a plurality of beacon signals as the distress signal at a predetermined period. For example, the EPIRB terminal 110 broadcasts a 406-MHz beacon signal as a search and rescue signal and a 121.5-MHz beacon signal as a homing signal. The distress signal may include information on the current position of the EPIRB terminal 110 as a distress message (or search and rescue message).

The 406-MHz beacon signal is a signal for supplementing the demerit of the 121.5-MHz signal, and the position of the EPIRB terminal 110 can be estimated from the 406-MHz beacon signal by using a Low Earth Orbit Search and Rescue (LEOSAR) system including a Low Earth Orbit Satellite (LEOSAT) and a Low Earth Orbit Local User Terminal (LEOLUT). In addition, the 406-MHz beacon signal can be used for the position estimation of the EPIRB terminal 110 in a Geostationary Earth Orbit Search and Rescue (GEOSAR) system including a Geostationary Earth Orbit Satellite (GEOSAT) and a Geostationary Earth Orbit Local User Terminal (GEOLUT).

A frame of the 406-MHz beacon signal is transmitted with the power of 5 W for about 0.5 second at every 50 seconds, and the 406-MHz beacon signal remarkably improves the accuracy and detection probability in the position estimation of the EPIRB terminal 110 because of the improved frequency stability, the guaranteed frequency guard band (406.0-406.1 MHz), and the high peak power. In addition, since the low duty cycle is applied, the 406-MHz beacon signal can process up to 90 EPIRB terminals existing within a service area of a satellite. In addition, since the EPIRB terminal 110 converts the distress message (search and rescue message) transmitted through the distress signal into digital codes, information on ID and position of the distressed moving object, that is, the vessel or the EPIRB terminal 110 is provided to the receiving side, for example, the COSPAS-SARSAT satellite 130, the LUT 140, and the MCC 150.

In addition, the 121.5-MHz beacon signal is relayed only in the COSPAS-SARSAT satellite 130. Accordingly, the service area defined by the 121.5-MHz beacon signal is limited to a radius of 3,000 Km from the LUT 140 and thus it is smaller than the service area defined by the 406-MHz beacon signal. Furthermore, in a case in which the EPIRB terminal 110 transmitting the 121.5-MHz beacon signal and the LUT 140 receiving the 121.5-MH beacon signal exist within the service area defined by the same COSPAS-SARSAT satellite 130, the position estimation and detection of the EPIRB terminal 110 are rapidly achieved.

In addition, the EPIRB terminal 110 receives the GPS signal from the GPS satellite 120, and the GPS signal includes the information on the current position of the EPIRB terminal 110 and may additionally include time information. Since the EPIRB terminal 110 will be described later in more detail with reference to FIGS. 2 to 4, detailed description thereof will be omitted herein.

The COSPAS-SARSAT satellite 130 receives the distress signal from the EPIRB terminal 110, and transmits the received distress signal to the LUT 140 located in a region nearest to the EPIRB terminal 110. The COSPAS-SARSAT satellite 130 includes a LEOSAT and a GEOSAT having the low earth orbit, and the LEOSAT includes a COSPAS satellite having a predetermined altitude, for example, 1,000 Km, and a SARSAT satellite having a predetermined altitude, for example, 850 Km.

In addition, in the COSPAS-SARSAT satellite 130, as described above, the LEOSAR system including the LEOSAT and the LEOLUT has the global range as the service area as the LEOSAT rotates along the low earth orbit. However, since the service area is discontinuous, the reception of the distress signal or the alarm signal from the EPIRB terminal 110 may be delayed. In the COSPAS-SARSAT satellite 130, as described above, the GEOSAR system including the GEOSAT and the GEOLUT receives the 406-MHz beacon signal by using the GEOSAT and the GEOLUT rotating along a stationary orbit. In the GEOSAR system, since the service area of the GEOSAT is discontinuous within 70 degrees southern and northern latitudes, there occurs no reception delay of the distress signal or the alarm signal from the EPIRB terminal 110. However, since the Doppler effect cannot be used, it is difficult to calculate the position of the EPIRB terminal 110 by using the distress signal or the alarm signal. Therefore, the position information of the EPIRB terminal 110 is coded using the GPS satellite 120, and the identification information and position information of the EPIRB terminal 110 are transmitted.

The COSPAS-SARSAT satellite 130 receives the 121.5-MHz beacon signal and the 406-MHz beacon signal from the EPIRB terminal 110 as the distress signal (alarm signal) of the EPIRB terminal 110, and converts the distress signal of the EPIRB terminal 110 into a predetermined frequency so that it is received by a terrestrial device, that is, the LUT 140. In addition, the COSPAS-SARSAT satellite 130 adjusts the power of the received beacon signals with the power required by the terrestrial device, and transmits the signals to the LUT 140. In the COSPAS-SARSAT satellite 130, the GEOSAT can process only the 406-MHz beacon signal.

In addition, the COSPAS-SARSAT satellite 130 demodulates the digital message included in the 406-MHz beacon signal, calculates the accurate frequency necessary to measure the position of the EPIRB terminal 110, generates an output frame by displaying position measurement time, transmits the generated output frame to the LUT 140, and stores the output frame in a memory. In a case in which another beacon signal is received while the received beacon signal according to the storing in the memory is processed and transmitted to the LUT 140, the COSPAS-SARSAT satellite 130 temporarily stops transmitting the processed beacon signal to the LUT 140, and preferentially receives another beacon signal. Then, the COSPAS-SARSAT satellite 130 processes all beacon signals and can perform the global mode operation.

In the COSPAS-SARSAT satellite 130, the LEOSAR system can perform the local mode operation and the global mode operation. In particular, when the 121.5-MHz beacon signal is received, the LEOSAR system operates in the local mode only. When the 406-MHz beacon signal is received, the LEOSAR system operates in the local mode and the global mode. The local mode refers to a mode in which, after processing the distress signal received from the EPIRB terminal 110, that is, the beacon signal, the processed beacon signal is transmitted or relayed to the LUT disposed within the service area of the COSPAS-SARSAT satellite 130. The global mode is a mode in which, after processing the distress signal received from the EPIRB terminal 110, that is, the beacon signal, data of the processed beacon signal is stored in the memory and the data of the processed beacon signal is broadcast to all LUTs.

The LUT 140 receives, from the COSPAS-SARSAT satellite 130, the beacon signals as the distress signal (alarm signal) transmitted from the EPIRB terminal 110, and calculates and estimates the position of the EPIRB terminal 110, that is, the position of the distressed vessel equipped with the EPIRB terminal 110. The LUT 140 transmits the distress signal of the EPIRB terminal 110 to the MCC 150 located in the region corresponding to the distress position of the vessel equipped with the EPIRB terminal 110.

The LUT 140 receives the relayed or processed beacon signal from the COSPAS-SARSAT satellite 130 in the above-described manner, recovers the necessary data by demodulating the received beacon signal, and transmits the recovered data to the MCC 150. The LUT 140 includes the LEOLUT and the GEOLUT. The LEOLUT converts a signal received from an antenna of the LUT 140 into an intermediate frequency, and detects a signal through demodulation. At this time, the detected signal is separated into respective frequency bands and detected. In addition, the LEOLUT processes the data of the 406-MHz beacon signal processed by the COSPAS-SARSAT satellite 130. The LEOLUT receives the 121.5-MHz beacon signal and the 406-MHz beacon signal from the COSPAS-SARSAT satellite 130, calculates Doppler information, and determines the position of the EPIRB terminal 110 by using the calculated Doppler information. The GEOLUT continuously receives the 406-MHz beacon signal from the COSPAS-SARSAT satellite 130, in particular, the GEOSAT, processes the received beacon signal, and the transmits the processed beacon signal to the MCC 150. At this time, when the position information of the EPIRB terminal 110 is included in the beacon signal, the distress signal (alarm signal) and the position information of the EPIRB terminal 110 are transmitted to the MCC 150.

In addition, the MCC 150 transmits the distress signal (alarm signal) and the position information of the EPIRB terminal 110 to the RCC 160. The RCC 160 allows the SAR unit 170 to perform the distressed vessel rescue through the distressed signal (alarm signal) and the position information of the EPIRB terminal 110. The MCC 150 collects and arranges the distressed signal and the position information of the EPIRB terminal 110 received from the LUT 150 through the transmission and reception with the MCCS as well as the LUTs located at another service area, and the data exchanged among the MCCs include alarm data and position data obtained by processing the beacon signal, and coordination data for improving the performance of the maritime search and rescue system.

In the maritime search and rescue system in accordance with the embodiment of the present invention, when the vessel is in distress, the EPIRB terminal 110 automatically broadcasts (transmits) the distress signal (alarm signal), and the COSPAS-SARSAT satellite 130 receives the distress signal transmitted from the EPIRB terminal 110 and transmits (relays) the received distress signal to the LUT 140 located in a region nearest to the position of the EPIRB terminal 110. The LUT 140 calculates the position of the EPIRB terminal 110 by using the Doppler effect, and transmits the information on the calculated position of the EPIRB terminal 110 to the RCC 160 through the MCC 150. In this manner, information necessary for the distress vessel rescue of the SAR unit 170 is provided. The EPIRB terminal in the maritime search and rescue system in accordance with the embodiment of the present invention will be described below in more detail with reference to FIGS. 2 to 4.

Figure 2:
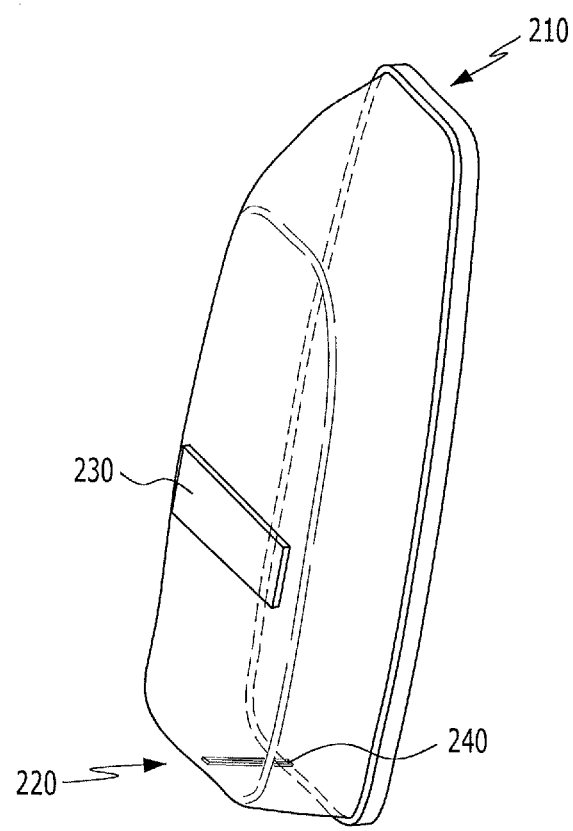
FIG. 2 is a view schematically illustrating a structure of a housing for installing the EPIRB terminal in the vessel in the maritime search and rescue system in accordance with the embodiment of the present invention.

FIG. 2 is a view schematically illustrating a structure of a housing for installing the EPIRB terminal in the vessel in the maritime search and rescue system in accordance with the embodiment of the present invention.

Referring to FIG. 2, the housing, as described above, installs the EPIRB terminal in the vessel in order for position identification and rescue of the distressed vessel. Before the vessel sinks under the sea and reaches a predetermined depth of water, for example, 4 m under the sea, the housing automatically separates the EPIRB terminal from the vessel. At this time, the EPIRB terminal separated from the vessel broadcasts the distress signal to the satellite, for example, the COSPAS-SARSAT satellite, at a predetermined period, as described above.

The housing installs the EPIRB terminal in the inside of the vessel in order to detect the sinking of the vessel more accurately. When the EPIRB terminal is installed, the housing is divided into an upper portion 210 and a lower portion 220 in order to identify the top and bottom of the vessel according to the surface of the water. The EPIRB terminal is disposed inside the housing and installed in the vessel. In addition, the housing includes a hole 240 at a predetermined position of the lower portion 220. The hole 240 serves as a water drainage hole through which the water is immediately drained when the water flows into the housing. Furthermore, the housing includes a transparent window 230 at a region corresponding to the region where the EPIRB terminal is disposed within the housing, so that the user can identify the operation state of the EPIRB terminal located inside the housing in real time.

In the maritime search and rescue system in accordance with the embodiment of the present invention, as the transparent window 230 and the hole 240 are provided in the housing for installing the EPIRB terminal in the vessel, the operation state of the EPIRB terminal disposed inside the housing and installed in the vessel is identified in real time through the transparent window 230, and the operation state of the EPIRB terminal is easily monitored in real time. In addition, when the moisture, rainwater, or seawater flows into the housing due to external environment factors, it is immediately drained through the hole 240 disposed at the lower portion 220 of the housing. Thus, the inside of the housing is always maintained in a dry condition, thereby preventing the malfunction of the EPIRB terminal, in particular, the malfunction of sensors provided in the EPIRB terminal. As a result, it is possible to prevent the wrong transmission of the distress signal, that is, the 406-MHz beacon signal and the 121.5-MHz beacon signal, due to the malfunction of the EPIRB terminal. The structure of the EPIRB terminal in the maritime search and rescue system in accordance with the embodiment of the present invention will be described below in more detail with reference to FIG. 3.

Figure 3:
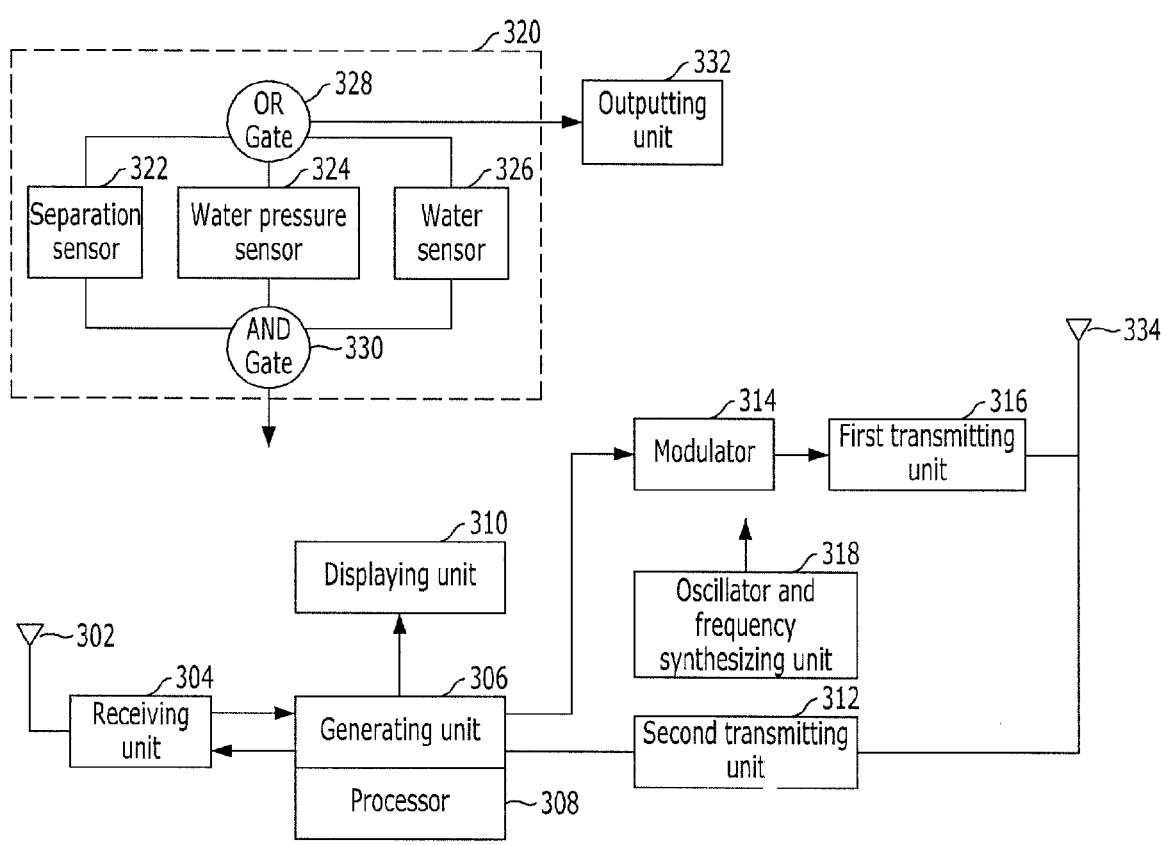
FIG. 3 is a configuration diagram schematically illustrating an EPIRB terminal in the maritime search and rescue system in accordance with the embodiment of the present invention.

Referring to FIG. 3, the EPIRB terminal includes a receiving unit 304, a generating unit 306, a processor 308, a displaying unit 310, a modulator 314, a first transmitting unit 316, and a second transmitting unit 312. The receiving unit 304 receives a GPS signal from a GPS satellite through a receive antenna 302. The GPS signal includes position information of the EPIRB terminal and time information. The generating unit 306 generates a distress message (search and rescue message) by using the position information of the EPIRB terminal received by the receiving unit 304 when a vessel is in distress. The processor 308 controls the generation of the search and rescue message of the generating unit 306 and the power of the receiving unit 304. The displaying unit 310 displays operation state information of the EPIRB terminal in real time according to the distress message (search and rescue message) generated from the generating unit 306. The modulator 314 modulates the distress signal (alarm signal) including the distress message (search and rescue message) generated from the generating unit 306, that is, the search and rescue signal, into a 406-MHz beacon signal. The first transmitting unit 316 broadcasts (transmits) the 406-MHz beacon signal generated from the modulator 314 through a transmit antenna 334, in other words, a COSPAS-SARSAT satellite. The second transmitting unit 312 broadcasts a 121.5-MHz beacon signal through the transmit antenna 334 using the distress signal (alarm signal) including the distress message (search and rescue message) generated from the generating unit 306 as a homing signal. In other words, the second transmitting unit 312 broadcasts (transmits) the 121.5-MH beacon signal to the COSPAS-SARSAT satellite.

In addition, the EPIRB terminal includes an oscillator and frequency synthesizing unit 318, a sensor unit 320, and an outputting unit 332. The oscillator and frequency synthesizing unit 318 provides a clock to each module and the transmitting units 312 and 316 of the EPIRB terminal. The sensor unit 320 senses the maritime disaster and the sinking of the vessel equipped with the EPIRB terminal. The generating unit 332 outputs the operation state of the EPIRB terminal, in particular, the operation state of the sensor unit 320, in real time.

The generating unit 306 generates the distress message (search and rescue message) by using the position information of the EPRIB terminal included in the GPS signal, so that the distress message (search and rescue message) includes the current position information of the EPIRB terminal, that is, the position information of the vessel distressed on the sea. The position information of the EPIRB terminal included in the distress message (search and rescue message), that is, the position information of the vessel distressed on the sea, is transmitted to the COSPAS-SARSAT satellite through the 406-MHz beacon signal and the 121.5-MHz beacon signal as the distress signal (alarm signal).

In addition, the sensor unit 320 includes a water pressure sensor 324, a water sensor 326, a separation sensor 322, and gates. The water pressure sensor 324 detects the sinking of the vessel by sensing the water pressure inside the housing disposed within the vessel when the EPIRB terminal is installed in the vessel through the housing. The water sensor 326 detects the sinking of the vessel by sensing the water inside the housing disposed within the vessel. The separation sensor 322 senses the separation of the EPIRB terminal from the vessel according to the sensing results of the water pressure sensor 324 and the water sensor 326. The gates output the sensing results of the sensors 322, 324 and 326, and include an OR gate 328 and an AND gate 330.

In more detail, the water pressure sensor 324 of the sensor unit 320 senses the water pressure inside the housing disposed within the vessel and, when the vessel sinks under a predetermined depth of water and exceeds a threshold water pressure value, the water pressure sensor 324 outputs a water pressure sensing signal to separate the EPIRB terminal from the vessel and transmit a distress signal (alarm signal).

In addition, the water sensor 326 of the sensor unit 320 senses water existing inside the housing disposed within the vessel and, when the vessel sinks on the sea so that water flows into the housing and the water inside the housing exceeds a threshold water value, the water sensor 326 outputs a water sensing signal to separate the EPIRB terminal from the vessel and transmit a distress signal (alarm signal).

Furthermore, the separation sensor 322 of the sensor unit 320 senses the separation of the EPIRB terminal from the vessel in correspondence to the output signals according to the sensing results of the water pressure sensor 324 and the water sensor 326, that is, the water pressure sensing signal and the water sensing signal. For example, when the EPIRB terminal is separated from the vessel, the separation sensor 322 outputs a separation sensing signal to allow the EPIRB terminal to transmit a distress signal (alarm signal).

The AND gate 330 of the sensor unit 320 receives the sensing signals outputted as the sensing results from the sensors 322, 324 and 326, that is, the water pressure sensing signal, the water sensing signal, and the separation sensing signal, and outputs a distress message (search and rescue message) generation request signal to the generating unit 306 to allow the EPIRB terminal to transmit a distress signal (alarm signal), in a case in which all sensing signals are received.

In other words, when the AND gate 330 receives the water pressure sensing signal, the water sensing signal, and the separation sensing signal, the EPIRB terminal operates normally, that is, the sensors 322, 324 and 326 operate normally.

Thus, the AND gate 330 detects the sinking of the vessel equipped with the EPIRB terminal and outputs the distress message (search and rescue message) generation request signal to the generating unit 306 as a control signal to allow the EPIRB terminal to transmit the distress signal (alarm signal). In addition, the generating unit 306 detects the sinking of the vessel through the distress message generation request signal by the normal operation of the EPIRB terminal, that is, the normal operation of the sensors 322, 324 and 326. Accordingly, as described above, the EPIRB terminal generates the distress signal and transmits the 406-MHz beacon signal and the 121.5-MHz beacon signal as the distress signal. That is, the EPIRB terminal recognizes the sinking of the vessel by the normal operation of the EPIRB terminal, that is, the normal operation of the sensors 322, 324 and 326, through the AND gate 330, and transmits the distress signal (alarm signal) to the COSPAS-SARSAT satellite.

In addition, the OR gate 328 of the sensor unit 320 receives the sensing signals outputted as the sensing results of the sensors 322, 324 and 326, that is, the water pressure sensing signal, the water sensing signal, and the separation sensing signal, and recognizes the EPIRB terminal as being in a malfunctioning state, that is, recognizes the sensors 322, 324 and 326 as being in a malfunctioning state, when at least one of the sensing signals is not received. Then, the OR gate 328 outputs the operation state monitoring result of the EPIRB terminal through the outputting unit 332. For example, the OR gate 328 outputs an alarm signal (alarm sound) indicating the malfunctioning state of the EPIRB terminal through the outputting unit 332 implemented with a speaker.

The outputting unit 332 outputs different alarm signals corresponding to the malfunctioning sensors among the sensors 322, 324 and 326, in other words, the sensors outputting the sensing signals among the sensors 322, 324 and 326. That is, the outputting unit 332 outputs different alarm signals of the respective sensors through the speaker, so that the user easily recognizes the malfunctioning sensors among the sensors 322, 324 and 326. The OR gate 328 outputs the alarm signal (alarm sound) indicating the malfunctioning state of the EPIRB terminal through the outputting unit 332, and displays the information on the malfunctioning sensors among the sensors 322, 324 and 326, in other words, the information on the sensors outputting the sensing signals among the sensors 322, 324 and 326, through the displaying unit 310. The user easily monitors the malfunction of the EPIRB terminal through the transparent window 230 of the housing and the outputting unit 332 in real time. At this time, when only some of the sensors 322, 324 and 326 output the sensing signals, the sensors outputting the sensing signals correspond to the malfunctioning sensors.

In addition, as described above, the AND gate 330 and the OR gate 328 recognize the operation state of the EPIRB terminal, that is, the operation states of the sensors 322, 324 and 326, and displays the operation state information of the EPIRB terminal on the displaying unit 310. The user monitors the operation state of the EPIRB terminal, which is outputted on the displaying unit 310, through the transparent window 230 in real time, and also monitors the operation state, in particular, malfunction of the EPIRB terminal, through the alarm signal outputted through the outputting unit 332 in real time. The AND gate 330 and the OR gate 328 supplies power to each module provided within the EPIRB terminal and controls each module in correspondence to the operation state of the recognized EPIRB terminal, in particular, the operation state of the EPIRB terminal with respect to the sinking and distress of the vessel. Specifically, the AND gate 330 and the OR gate 328 controls the signal transmission mode so that the EPIRB terminal transmits the distress signal (alarm signal) in correspondence to the sinking and distress of the vessel.

In the maritime search and rescue system in accordance with the embodiment of the present invention, the EPIRB terminal broadcasts (transmits) the distress signal (alarm signal) to the COSPAS-SARSAT satellite when all sensors, that is, the separation sensor 322, the water pressure sensor 324, and the water sensor 326 operate normally to detect the sinking and distress of the vessel. In particular, when all of the separation sensor 322, the water pressure sensor 324, and the water sensor 326 detect the sinking and distress of the vessel, they generate the distress message (search and rescue message) and transmit the 406-MHz beacon signal and the 121.5-MHz beacon signal as the distress signal including the distress message. In addition, since the EPIRB terminal outputs the operation state of the EPIRB terminal, in particular, the operation states of the separation sensor 322, the water pressure sensor 324, and the water sensor 326, through the outputting unit 332 and the displaying unit 310 in real time, the user monitors the operation state of the EPIRB terminal in real time. Furthermore, the user easily monitors the operation state of the EPIRB terminal, which is outputted from the displaying unit 310, through the transparent window 230 provided in the housing.

Therefore, in this embodiment, water, rainwater, or seawater flowing into the housing due to external environment factors is drained through the hole 240 disposed at the lower portion of the housing. Thus, the inside of the housing is always maintained in a dry condition, thereby preventing the malfunction of the EPIRB terminal, in particular, the malfunction of the sensors provided in the EPIRB terminal. The user can easily monitor the operation state of the EPIRB terminal through the outputting unit 332, the displaying unit 310, and the transparent window 230 in real time. Also, the distress signal (alarm signal) is transmitted only when all the sensors included in the EPIRB terminal normally detect the sinking of the vessel. Thus, it is possible to prevent the wrong transmission of the distress signal, that is, the 406-MHz beacon signal and the 121.5-MHz beacon signal, due to the malfunction of the EPIRB terminal. The operation of the EPIRB terminal in the maritime search and rescue system in accordance with the embodiment of the present invention will be described below in more detail with reference to FIG. 4.

Figure 4:
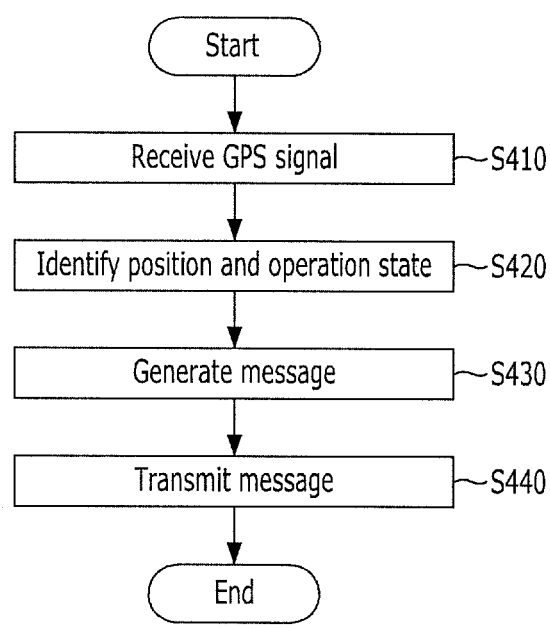
FIG. 4 is a view schematically illustrating the operation of the EPIRB terminal in the maritime search and rescue system in accordance with the embodiment of the present invention.

FIG. 4 is a view schematically illustrating the operation of the EPIRB terminal in the maritime search and rescue system in accordance with the embodiment of the present invention.

Referring to FIG. 4, at step S410, the EPIRB terminal receives the GPS signal, including position information of the EPIRB terminal and time information, from the GPS satellite. At step S420, the current position of the EPIRB terminal is identified using the position information of the EPIRB terminal included in the GPS signal, and the operation state of the EPIRB terminal, that is, the operation states of the sensors included in the EPIRB terminal are identified. At this time, by identifying the position of the EPIRB terminal, the position information of the vessel is identified in the event of the sinking and distress of the vessel equipped with the EPIRB terminal.

As described above, the operation state of the SPIRE terminal is easily identified through the outputting unit, the displaying unit, and the transparent window of the housing in real time. At this time, as described above, the sensors sense water pressure, water, and separation in the inside of the housing provided within the vessel equipped with the EPIRB terminal, and output the sensing signals according to the sensing results.

In addition, in a case in which at least one of the sensing signals outputted as the sensing results of the sensors, that is, the water pressure sensing signal, the water sensing signal, and the separation sensing signal, is not outputted, it is recognized as the malfunction of the EPIRB terminal, that is, the malfunction of the sensors, as the operation state monitoring result of the EPIRB terminal. The operation state monitoring result of the EPIRB terminal is outputted through the outputting unit. For example, the alarm signal (alarm sound) indicating the malfunctioning state of the EPIRB terminal is outputted through the outputting unit implemented with a speaker. At the same time when the alarm signal (alarm sound) indicating the malfunctioning state of the EPIRB terminal is outputted through the outputting unit, the malfunctioning sensors among the sensors are outputted through the displaying unit, and the user easily monitors the malfunction of the EPIRB terminal through the transparent window of the housing and the outputting unit in real time.

At step S430, when all of the sensors included in the EPIRB terminal, that is, the separation sensor, the water pressure sensor, the water sensor, detect the sinking and distress of the vessel equipped with the EPIRB terminal, in other words, when the all of the separation sensor, the water pressure sensor, and the water sensor output the sensing signals, the distress message (search and rescue message) including the current position information of the EPIRB terminal, in other words, the position information of the vessel distressed on the sea, is generated using the position information of the EPIRB terminal included in the GPS signal.

At step S440, the distress signal (alarm signal) including the distress message (search and rescue message) is transmitted, and the distress signal (alarm signal) is transmitted to the COSPAS-SARSAT satellite as the 406-MHz beacon signal and the 121.5-MHz beacon signal.

While the present invention has been described with respect to the specific embodiments, it will be apparent to those skilled in the art that various changes and modifications may be made without departing from the spirit and scope of the invention as defined in the following claims.

The invention claimed is:

1. An emergency position indicating radio beacon (EPIRB) terminal in a maritime search and rescue system, comprising:
   a sensor unit configured to sense a sinking of a vessel equipped with the EPIRB terminal;
   a generating unit configured to generate a distress message corresponding to the sensing result of the sensor unit; and
   a transmitting unit configured to broadcast a distress signal including the distress message,
   wherein the sensor unit comprises:
   a water pressure sensor configured to sense water pressure inside the vessel and output a water pressure sensing signal;
   a water sensor configured to sense water inside the vessel and output a water sensing signal;
   a separation sensor configured to sense a separation of the EPIRB terminal from the vessel and output a separation sensing signal;
   in a case in which all of the water pressure sensing signal, the water sensing signal, and the separation sensing signal are outputted, the sensor unit recognizes the case as the sinking of the vessel, and outputs a distress signal generation request signal to the generating unit, and
   in a case in which at least one of the water pressure sensing signal, the water sensing signal, and the separation sensing signal is not outputted, the sensor unit recognizes the case as the malfunction of the water pressure sensor, the water sensor, and the separation sensor;

an outputting unit configured to output an alarm signal corresponding to the malfunctioning sensor, based on the malfunction of the water pressure sensor, the water sensor, and the separation sensor, in real time; and a displaying unit configured to display sensor information corresponding to the malfunction of the water pressure sensor, the water sensor, and the separation sensor, and operation state information of the EPIRB terminal corresponding to the distress message in real time.

2. The EPIRB terminal of claim 1, further comprising a modulator configured to modulate a search and rescue signal including the distress message into a 406-MHz beacon signal, wherein the transmitting unit broadcasts the 406-MHz beacon signal to a COSPAS-SARSAT satellite at a predetermined period.

3. The EPIRB terminal of claim 1, wherein the transmitting unit broadcasts a homing signal including the distress message to a COSPAS-SARSAT satellite as a 121.5-MHz at a predetermined period.

4. The EPIRB terminal of claim 1, further comprising a receiving unit configured to receive position information of the EPIRB terminal from a global positioning system (GPS), wherein the generating unit includes position information of the sunken vessel in the distress message by using the position information.

5. An apparatus for monitoring an emergency position indicating radio beacon (EPIRB) terminal in a maritime search and rescue system, comprising:

a housing configured to install the EPIRB terminal inside a vessel; and the EPIRB terminal disposed inside the housing and configured to sense a sinking of the vessel, wherein the housing comprises:

a transparent window configured to monitor an operation state of the EPIRB terminal in real time; and a hole configured to drain water flowing into the housing to prevent the malfunction of the EPIRB terminal, in a case in which the EPIRB terminal senses the sinking of the vessel, the housing automatically separates the EPIRB terminal from the vessel, and the EPIRB terminal broadcasts a distress signal to a COSPAS-SARSAT satellite at a predetermined period, wherein the EPIRB terminal comprises:

an outputting unit configured to output an alarm signal in real time according to operation states of a plurality of sensors included in the EPIRB terminal; and a displaying unit configured to display the operation states of the plurality of sensors and the operation state of the EPIRB terminal in real time, wherein the plurality of sensors comprise:

a water pressure sensor configured to sense water pressure inside the housing;

a water sensor configured to sense water inside the housing; and a separation sensor configured to sense a separation from the vessel in correspondence to the sensing of the water pressure sensor and the water sensor.

6. The apparatus of claim 5, wherein the outputting unit outputs different alarm signals according to the operation states of the plurality of sensors, and the displaying unit displays sensor information according to the operation states of the plurality of sensors.

7. The apparatus of claim 5, wherein the transparent window provides the operation state, which is displayed through the displaying unit in real time, to the outside of the housing in real time.

8. The apparatus of claim 5, wherein, in a case in which all of the plurality of sensors normally sense the sinking of the vessel, the EPIRB terminal broadcasts the distress signal, and in a case in which only arbitrary sensors among the plurality of sensors sense the sinking of the vessel, the generating unit and the displaying unit output and display the operation states of the arbitrary sensors as a malfunctioning state.

9. The apparatus of claim 8, wherein the EPIRB terminal broadcasts a 406-MHz beacon signal and a 121.5-MHz beacon signal as the distress signal including the position information of the vessel.

10. The apparatus of claim 9, wherein the EPIRB terminal receives the position information of the EPIRB terminal from a GPS satellite, and identifies position information of the vessel.

11. A method for monitoring an emergency position indicating radio beacon (EPIRB) terminal in a maritime search and rescue system, comprising:

sensing water pressure, water, and separation within a housing provided within a vessel equipped with the EPIRB terminal;

providing an operation state of the EPIRB terminal in real time according to the sensing results of the water pressure, the water, and the separation; and separating the EPIRB terminal from the vessel when the sinking of the vessel is sensed from the sensing results of the water pressure, the water, and the separation, and broadcasting a distress signal to a COSPAS-SARSAT satellite at a predetermined period, wherein the EPIRB terminal is installed in and separated from the vessel by the housing, and the housing drains water flowing into the housing through a hole to prevent the malfunction of the EPIRB terminal, and provides an operation state of the EPIRB terminal through a transparent window to the outside of the housing in real time.

12. The method of claim 11, wherein, in said providing an operation state of the EPIRB terminal, the sensing results of the water pressure, the water, and the separation are outputted as different alarm signals through a speaker, and sensing information corresponding to the sensing results is displayed through the transparent window.

13. The method of claim 12, further comprising:

in a case in which the sensing results of the water pressure, the water, and the separation show that the sinking of the vessel is sensed normally, the distress signal is broadcast, and in a case in which only arbitrary sensing results among the sensing results of the water pressure, the water, and the separation show that the sinking of the vessel is sensed, the sensing operation corresponding to the arbitrary sensing results are outputted and displayed as a malfunction.

14. The method of claim 13, wherein, in said broadcasting a distress signal, a 406-MHz beacon signal and a 121.5-MHz beacon signal are broadcast as the distress signal including the position information of the vessel.

15. The method of claim 14, further comprising:
   receiving the position information of the EPIRB terminal from a GPS satellite; and
   identifying the position information of the vessel.

\* \* \* \* \*